Sept. 10, 1963 J. A. CHURCHILL 3,103,363

SOUND REPRODUCING MACHINES

Filed June 13, 1960 3 Sheets-Sheet 1

INVENTOR
JOHN ADRIAN CHURCHILL
BY [signature]
ATTORNEY

Sept. 10, 1963 J. A. CHURCHILL 3,103,363

SOUND REPRODUCING MACHINES

Filed June 13, 1960 3 Sheets-Sheet 2

INVENTOR
JOHN ADRIAN CHURCHILL
BY [signature]
ATTORNEY

Sept. 10, 1963 J. A. CHURCHILL 3,103,363

SOUND REPRODUCING MACHINES

Filed June 13, 1960 3 Sheets-Sheet 3

INVENTOR
JOHN ADRIAN CHURCHILL
BY [signature]
ATTORNEY

United States Patent Office 3,103,363

Patented Sept. 10, 1963

3,103,363

SOUND REPRODUCING MACHINES

John Adrian Churchill, Thorpe-le-Soken, England, assignor to Foster-Mallard Limited, London, England Filed June 13, 1960, Ser. No. 35,528

Claims priority, application Great Britain June 15, 1959

5 Claims. (Cl. 274—10)

This invention relates to sound reproducing machines of the kind in which grooved disc-shaped records are used in association with a pick-up device; the machine being arranged to play the records automatically one after another and the records to be played, which form a stack coaxial with and spaced upwardly from a turntable, being supported by means mounted on a spindle coxial with the turntable, the supporting means being arranged to release the records one-by-one and allow them to drop onto the turntable.

The object of the invention is to provide improved record supporting and releasing means.

According to the invention, in a record-supporting spindle for a sound reproducing machine of the kind referred to, a plurality of retractable record supporting members mounted on the said spindle provide, when extended, radially projecting shoulders to support the lowermost one of a stack of records on the spindle and are acted upon by biasing means urging them inwardly to release and allow downward movement of a record supported thereon, a flexible and resilient sleeve being provided which surrounds said spindle above the record supporting members, and means being provided which act simultaneously on said record supporting members and on said sleeve to allow retraction of said record supporting members and to expand said sleeve along at least one diameter of the spindle so that the said sleeve grips the periphery of the hole in a second record resting on the lowermost one and supports that record until the record supporting members are re-extended.

Preferably, the record supporting members are biased inwardly by a second flexible and resilient sleeve surrounding them, and the said members may comprise part-cylindrical members surrounding a reduced portion of the spindle.

The first flexible and resilient sleeve may be expanded by outward movement of a pair of bar members mounted in a diametral slot in the spindle.

The bar members and the part cylindrical members may be operated simultaneously by a rod slidable in a longitudinal bore in the spindle and carrying members which co-operate with inclined surfaces on said bar members and record-supporting members.

The invention is hereinafter described with reference to the accompanying drawings, in which.

Figure 1:
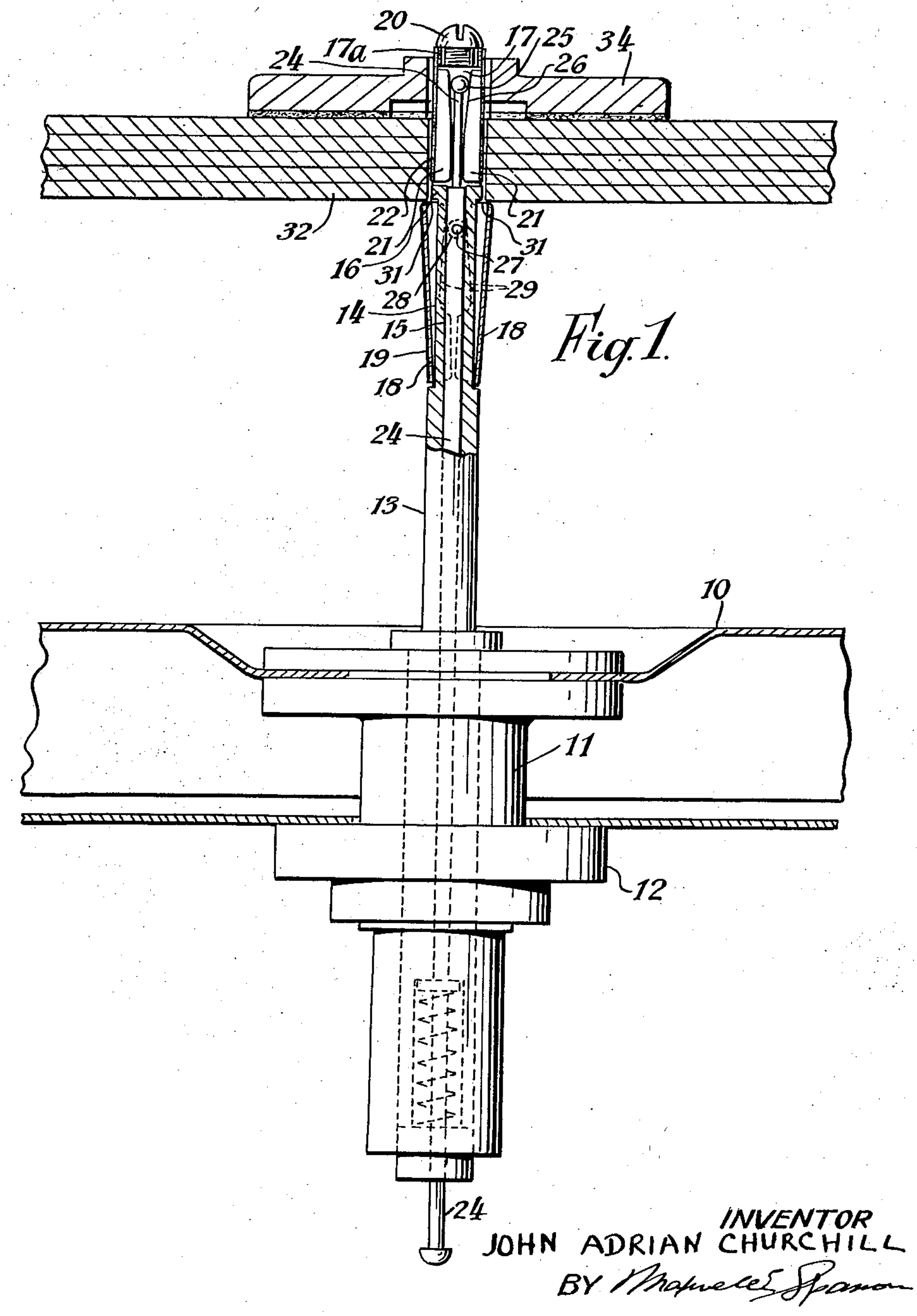
FIGURE 1 is a sectional elevation of the turntable and spindle of a sound reproducing machine embodying the invention.
Figures 2, 4, 5:
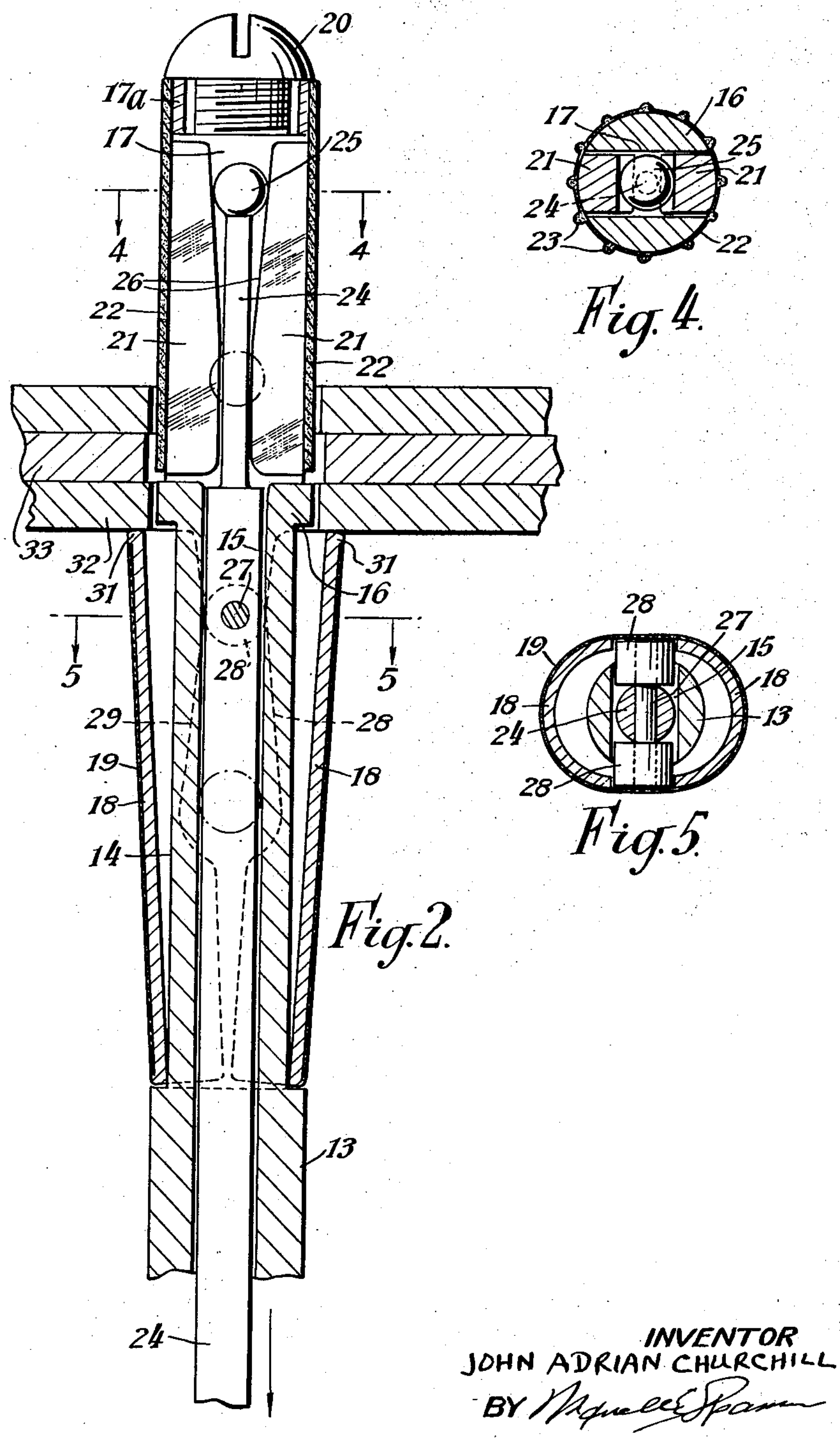
FIGURE 2 is a sectional elevation of the upper part of the spindle, on an enlarged scale, showing the record-supporting members in their record-supporting position.
Figure 3:
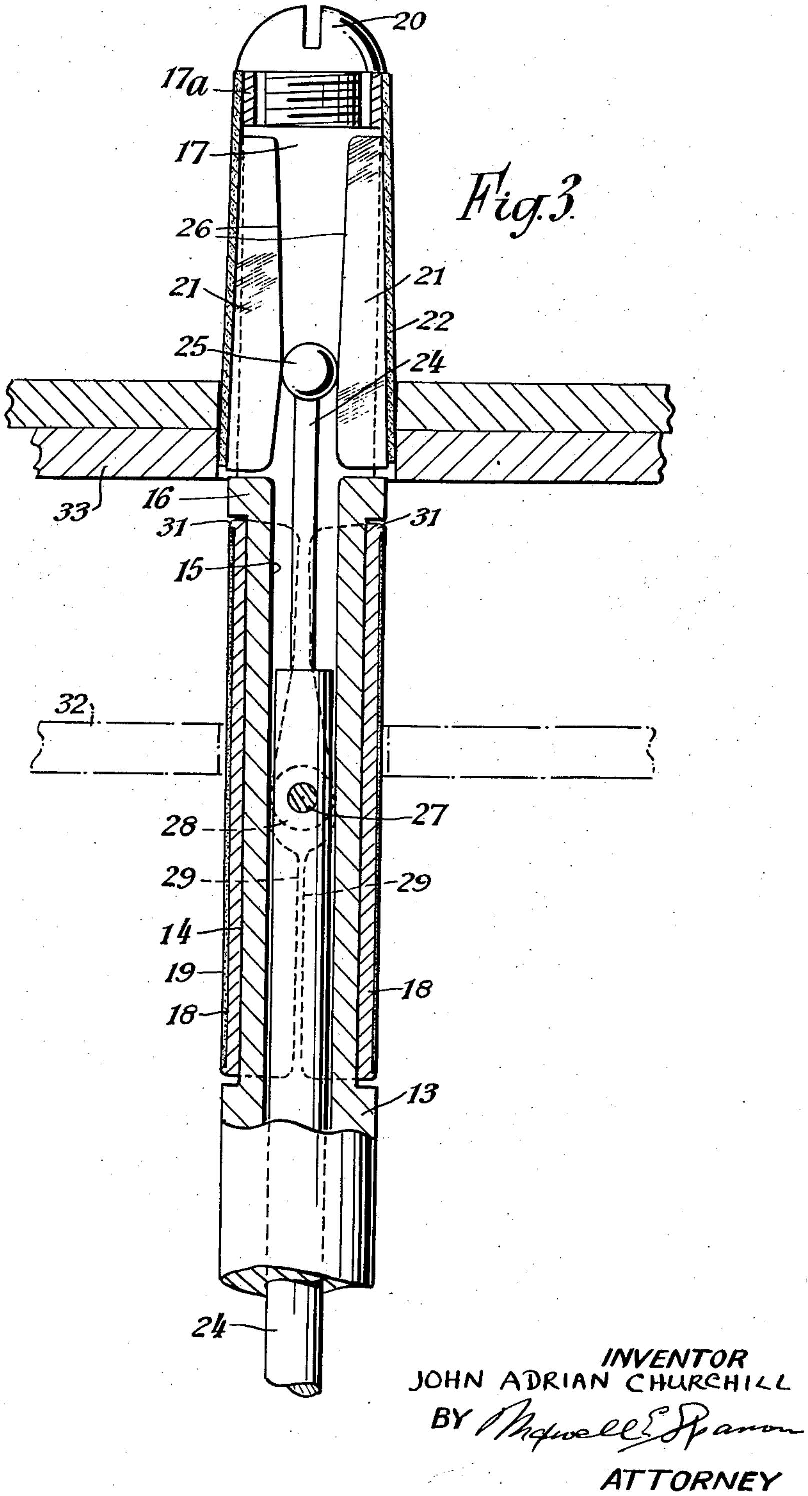

FIGURE 3 is a view similar to FIGURE 2 showing the positions of the parts at the instant of release of a record; and FIGURES 4 and 5 are respectively sections on the lines 4—4 and 5—5 in FIGURE 2.

Referring to the drawings, the turntable 10 of a sound reproducing machine of the kind referred to is mounted on a sleeve 11 rotatable in a bearing 12 in the base-plate of the machine. A spindle 13 fitting in the sleeve 11 and frictionally engaged therein stands up above the centre of the turntable. Instead of being frictionally engaged in the sleeve, the spindle may have a splined or key-and-slot engagement therewith, and is removable upwardly from the sleeve to facilitate the removal of records which have dropped on to the turntable.

The turntable is driven by a friction wheel engaging the internal surface of a rim thereon, in the usual manner.

The spindle 13 is tubular and has an intermediate portion 14 which is of reduced external diameter and is slotted diametrally at 15. An upper portion 16 of the spindle, also having a reduced external diameter, is slotted diametrally at 17, the slot 17 being at right angles to the slot 15 in the intermediate portion 14. The slot 17 extends to the upper end of the spindle the latter being reinforced at that end by a ring 17*a* retained in position by a screw 20 engaging a screw thread in the top of the bore of the spindle.

On the intermediate portion 14 of the spindle there are mounted two hollow half-cylindrical members 18, 18, elongated in the direction of the length of the spindle, and around these members is fitted a thin sleeve 19 of rubber or like elastomeric material which tends to draw the said half-cylindrical members 18, 18 inwardly to positions shown in FIGURE 3 in which they lie within the maximum diameter of the spindle.

In the slot 17 in the upper portion 16 of the spindle there are mounted a pair of elongated bar members 21, 21 and this part of the spindle is surrounded by another sleeve 22 of rubber or like elastomeric material, somewhat thicker than the first-mentioned sleeve 19 and having its external surface ribbed as shown at 23 in FIGURE 4, or otherwise formed wtih a raised pattern. This sleeve 22 urges the bar members 21, 21 inwardly and, when contracted on to the spindle as shown in FIGURE 2, has an external diameter equal to the main diameter of the spindle.

Slidably mounted in the spindle 13 is a rod 24 having, at its upper end, a ball-shaped head 25 engaging between downwardly convergent camming surfaces 26 on the inner edges of the elongated bar members 21, 21, the arrangement being such that, when the head 25 is in the upper position shown in FIGURE 2 the elongated bar members 21, 21, are retracted into the slot 17, and downward movement of the rod moves the bar members 21, 21 outwardly to expand the sleeve 22. The rod 24 also carries a transverse pin 27 in the slot 15 on which are mounted a pair of rollers 28, 28 co-operating with camming surfaces 29, 29 on the edges of the half-cylindrical members 18, 18, the camming surfaces 29, 29 being so shaped that, when the rollers 28, 28 are between their upper ends, the said upper ends are held in an outwardly extending position as shown in FIGURE 2 and provide shoulders 31, 31 to support a record 32 on the spindle, whilst downward movement of the rollers 28, 28 allows the said upper ends of the half-cylindrical members 18, 18 to retract inwardly to the position shown in FIGURE 3. Downward movement of the rod thus retracts the half-cylindrical members 18, 18 and expands the sleeve 22 surounding the elongated bar members 21, 21.

The vertical spacing between the shoulders 31, 31 at the upper ends of the half-cylindrical members 18, 18 and the lower end of the second sleeve 22 is slightly greater than the thickness of a record so that, when the lowermost one 32 of a stack of records is resting on the said shoulders, the second lowest record 33 in the stack, surrounds the lower end of the said sleeve 22. Thus, when the half-cylindrical members 18, 18 are retracted to release the lowermost record 32, the next lowest one 33 is gripped by the expanded sleeve 22, to prevent the remaining records from falling, until the half-cylindrical members 18, 18 have returned to their extended positions.

The stack of records is held in a horizontal position by a member such as a weighted disc 34 resting on the uppermost record and guided in any suitable manner to prevent tilting.

The disc 34 may, for example, be carried by a horizontal arm, not shown, mounted on a stem slidable and rotatable in a vertical guide outside the radius of the turntable, the disc being rotatably mounted on the said arm.

The rod 24 may be moved downwardly by any suitable mechanism brought into action by a control member which performs a control cycle for each change from the playing of one recording to another, and may be returned upwardly by a spring (not shown). It will be evident that, by suitable modification of the camming surfaces, the arrangement can be modified for operation by an upward push on the rod instead of by a downward pull.

The release of each record to allow it to fall onto the turntable 10 takes place in the following manner. Prior to release, the lowermost record 32 is resting on the shoulders 31, 31 and is supporting any records above it, the upper records being free to slide on the sleeve 22 as shown in FIGURE 2. The downward movement of the rod 24 expands the bar members 21, 21 outwardly and allows the half-cylindrical members 18, 18 to retract. The expansion of the bar members 21, 21 expands the sleeve 22 to grip the second record 33 and any additional records above it, and the retraction of the half-cylindrical members 18, 18 releases the lowermost record 32, which is then free to fall. FIGURE 3 shows the position as the record 32 is falling. When the record 32 has fallen, the rod 24 is allowed to return to its upper position, the sleeve 22 then contracting as the half-cylindrical members 18, 18 move outwardly, and the record 33 drops on to the shoulders 31, 31 ready for release at the next operation.

The two half-cylindrical members 18, 18 may be replaced by three or more part-cylindrical members each subtending a smaller angle at the spindle axis, the expanding means on the rod 24 being suitably modified to act on all of them.

Although the invention has been described in relation to a spindle which rotates with the turntable, it will be understood that the spindle may be fixed, so that the records supported thereon are stationary, the turntable rotating around it.

I claim:

1. A record-supporting spindle for a sound reproducing machine, said spindle having an intermediate portion having a reduced diameter and having a plurality of non-resilient retractable record-supporting members mounted on said intermediate portion, said members in their extended position providing radially projecting shoulders to support the lowermost one of a stack of records on said spindle, biasing means urging said non-resilient members inwardly to release and allow downward movement of a record supported on said shoulders of said members, a first flexible and resilient sleeve surrounding said spindle above said intermediate portion, a second flexible and resilient sleeve surrounding said members, biasing said members inwardly, and operating means for simultaneously causing retraction of said members and expansion of a part of said sleeve, said part of said sleeve gripping the periphery of the hole in at least one of said stack of records resting on the lowermost one and holding said records until said members are re-extended.

2. A record-supporting spindle according to claim 1, and wherein said members consist of hollow half-cylindrical parts surrounding said reduced portion of said spindle.

3. A record-supporting spindle according to claim 1, and a diametral slot in said spindle, a pair of bar members mounted in said diametral slot in said spindle, said pair of bar members expanding said first flexible and resilient sleeve.

4. A record-supporting spindle according to claim 3, and said means operating two hollow half-cylindrical parts for a movement in a common diametral plane of said spindle.

5. A record-supporting spindle according to claim 4, and having a longitudinal bore in said spindle, a rod slidable in said bore, said rod having a ball-shaped head and said pair of bar members and said two hollow half-cylindrical parts having inclined surfaces thereon, said ball-shaped head of said rod simultaneously engaging operatively said inclined surfaces of both said pair of bar members and of said two hollow half-cylindrical parts surrounding said reduced portion of said spindle.

References Cited in the file of this patent

UNITED STATES PATENTS

| | | |
|---|---|---|
| 2,542,759 | Exley | Feb. 20, 1951 |
| 2,617,655 | Leonard | Nov. 11, 1952 |

FOREIGN PATENTS

| | | |
|---|---|---|
| 62,822 | Denmark | Oct. 23, 1944 |
| 1,038,785 | Germany | Sept. 11, 1958 |